United States Patent
Weng

(10) Patent No.: US 6,494,168 B2
(45) Date of Patent: Dec. 17, 2002

(54) THROWAWAY DOG'S DUNG BAG AND ADJUSTABLE TIE-BELT COMBINATION UNIT

(76) Inventor: Yi-Lung Weng, Rm. 2, 7F, No. 306, Kuang-Fu South Rd., Taipei (TW)

( * ) Notice: Subject to any disclaimer, the term of this patent is extended or adjusted under 35 U.S.C. 154(b) by 0 days.

(21) Appl. No.: 09/753,847

(22) Filed: Jan. 3, 2001

(65) Prior Publication Data
US 2002/0056419 A1 May 16, 2002

(30) Foreign Application Priority Data
Nov. 13, 2000 (TW) .......................................... 089219579

(51) Int. Cl.[7] .............................................. A01K 23/00
(52) U.S. Cl. .................................................... 119/868
(58) Field of Search ................................ 119/868, 867, 119/869, 838, 809

(56) References Cited

U.S. PATENT DOCUMENTS

| | | | | |
|---|---|---|---|---|
| 3,656,459 A | * | 4/1972 | Missud | |
| 3,786,787 A | * | 1/1974 | Weinberger | |
| 3,792,687 A | * | 2/1974 | Ehrman | |
| 3,817,217 A | * | 6/1974 | Matuka et al. | |
| 3,875,903 A | * | 4/1975 | Sarvary | |
| 4,103,645 A | * | 8/1978 | Tyler | |
| 4,156,402 A | * | 5/1979 | Naiztat | |
| 4,444,152 A | * | 4/1984 | Berardo | |
| 4,510,887 A | * | 4/1985 | Lincoln et al. | |
| 4,709,661 A | * | 12/1987 | Mayle, Jr. | |
| 4,969,419 A | * | 11/1990 | Fong | |
| 5,315,960 A | * | 5/1994 | Lamp | |
| 5,355,836 A | * | 10/1994 | Vallery | |
| 5,386,802 A | * | 2/1995 | Hang-Fu | |
| 5,427,059 A | * | 6/1995 | Logan | |
| 5,813,369 A | * | 9/1998 | Fujinaga | 119/868 |
| 5,819,691 A | * | 10/1998 | Lavi et al. | 119/868 |
| 5,937,795 A | * | 8/1999 | Raphael | 119/869 |

* cited by examiner

Primary Examiner—Yvonne R. Abbott
(74) Attorney, Agent, or Firm—Bucknam and Archer

(57) ABSTRACT

A throwaway dog's dung bag and adjustable tie-belt combination unit includes a throwaway bag and tie-belts for fixing the bag on dog's buttocks, wherein the bag is a soft sack with hard frame on its mouth. Hook rabbets are provided on the two flanks of the frame. A vertical tie-belt is fixed to surround dog's abdomen or legs. Two horizontal tie-belts, one end of which is separately connected to the two flanks of the vertical tie-belt, while the free end of which has hooks for hooking into the rabbets in bag frames. Thus, the bag can be fixed to the dog's buttocks. The opening of the frame is placed against dog's anus to receive excreta. Such unit can enhance environment protection and sanitation conditions.

6 Claims, 3 Drawing Sheets

THROWAWAY DOG'S DUNG BAG AND ADJUSTABLE TIE-BELT COMBINATION UNIT

BACKGROUND OF THE INVENTION

This invention relates to throwaway dog's dung bag and adjustable tie-belt combination unit. Particularly, this invention relates to vertical tie-belt and horizontal tie-belts. Both of the tie-belts are connected to the dog's body for fixing the throwaway bag to accept excreta. This unit can enhance environment protection and sanitation conditions.

PRIOR ART

As shown in FIG. 1 (Publication No. 368,790 for Taiwanese Utility Model Patent) which discloses a kind of portable bag clips for collecting dog's dung. It mainly consists of hand grasping clip arms and a pair of collecting bags. By means of flexibility of the material as well as the leverage of clip arms, collecting bags can be opened by hand force, and be closed without hand force. However, it is inconvenient when the dog's excreta are to be cleaned with aforesaid clips, the owner of a dog has to squat on the ground to do it. Moreover, if the excreta are muddy, it can not be cleaned up completely and is therefore unsanitary.

SUMMARY OF THE INVENTION

The main object of the present invention is to provide a throwaway dog's dung bag and adjustable tie-belt combination unit for the purpose of improving the defect of conventional dog's excreta handling unit so as to enhance environment protection and sanitation conditions.

In order to attain the above and other objects, this invention includes a throwaway bag and tie-belts for fixing such bag on dog's buttocks: wherein the bag is a soft sack with hard frame on the mouth of the bag; hook rabbet provided on the two flanks of the frame; a vertical tie-belt fixed on dog's body such as on its abdomen or legs; two horizontal tie-belts, one end of which is separately connected to the two flanks of vertical tie-belt, while the free end of which has hooks for hooking into the rabbets in bag frames. Thus the bag can be fixed to the dog's buttocks. Placing the opening of the frame against dog's anus for receiving excreta. Thus, the trouble of picking up excreta at any time or anywhere can be avoided. It may also enhance environment protection and sanitation conditions.

According to the present invention, a thin rope is provided on the flank of bag frame. After using the bag, thin rope is used for tying up the bag for throwing away. Moreover, the bag and its frame can be made of paper or other regenerated material with combustibility. Therefore, its production cost is low and will not increase extra burden of garbage disposal. This is another object of this invention.

BRIEF DESCRIPTION OF THE DRAWINGS

For further understanding the above and other objects, feature and efficiency of this invention, the present invention will be described with reference to the drawings.

DETAILED DESCRIPTION OF THE PREFERRED EMBODIMENTS

Figure 1:
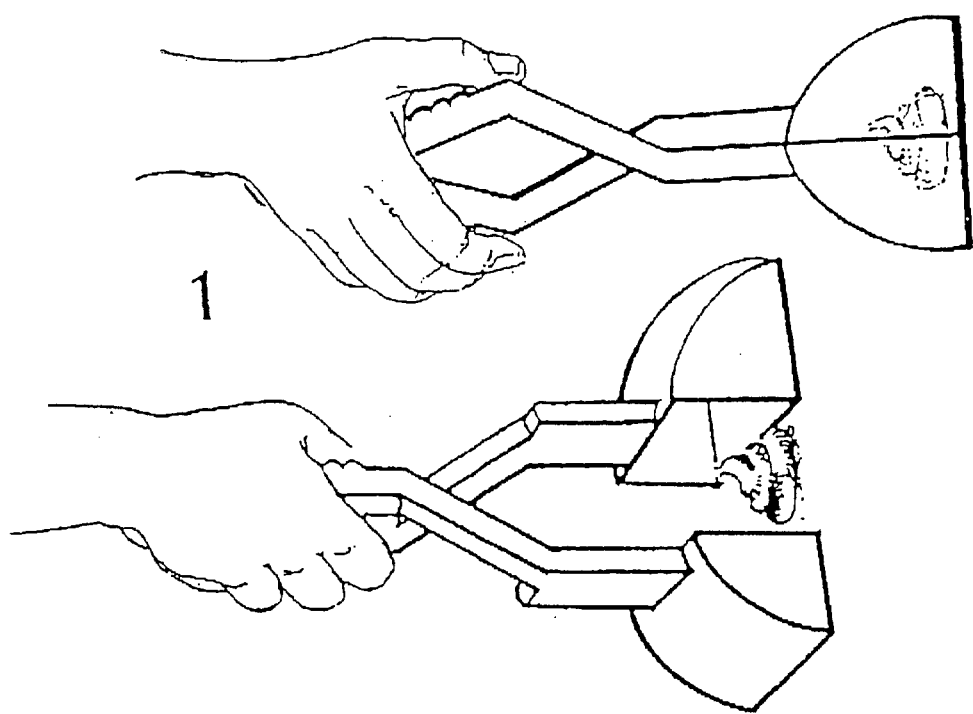
FIG. 1 is the conventional technique of Publication No. 368,790 for Taiwanese Utility Model Patent.
Figure 2:
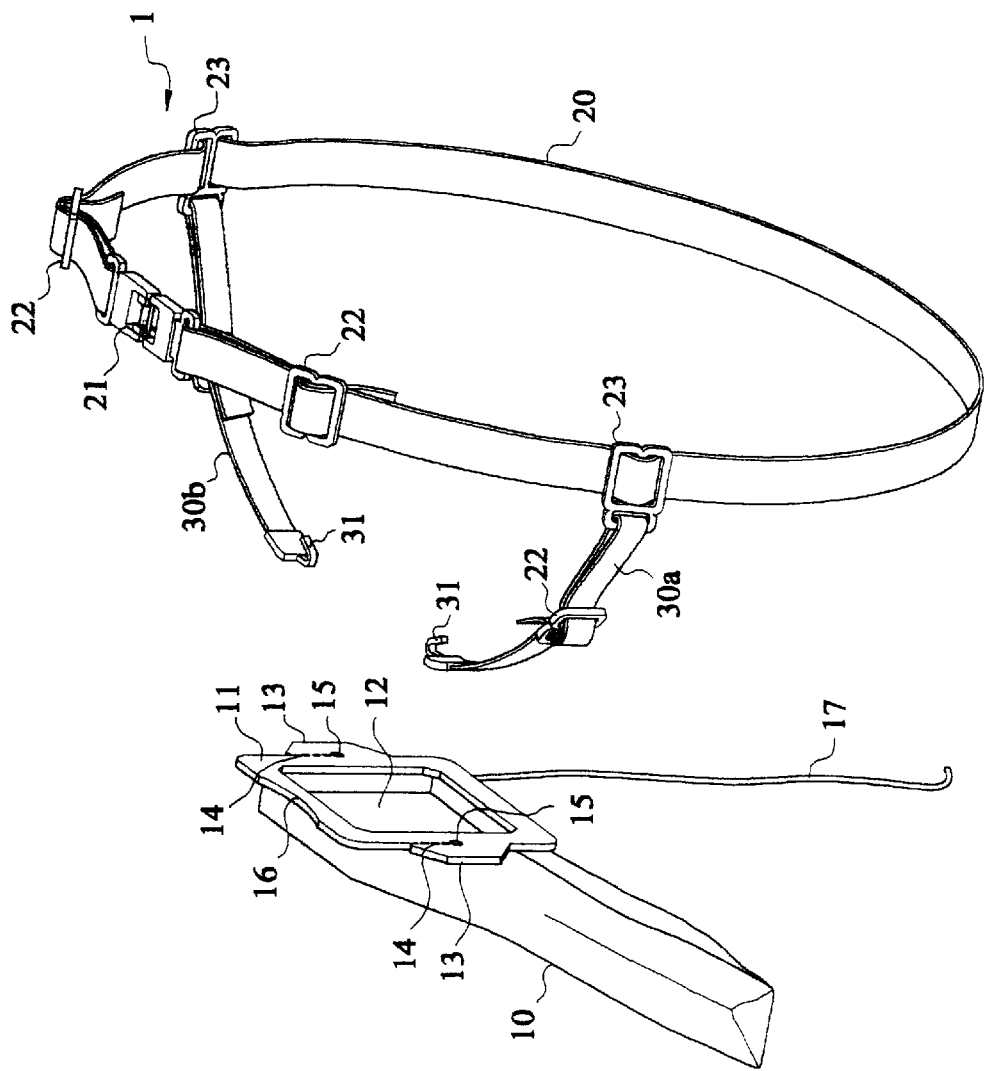
FIG. 2 is the schematic view of breaking up state of the embodiment of throwaway dog's dung bag and adjustable tie-belt combination unit of this invention.
Figure 3:
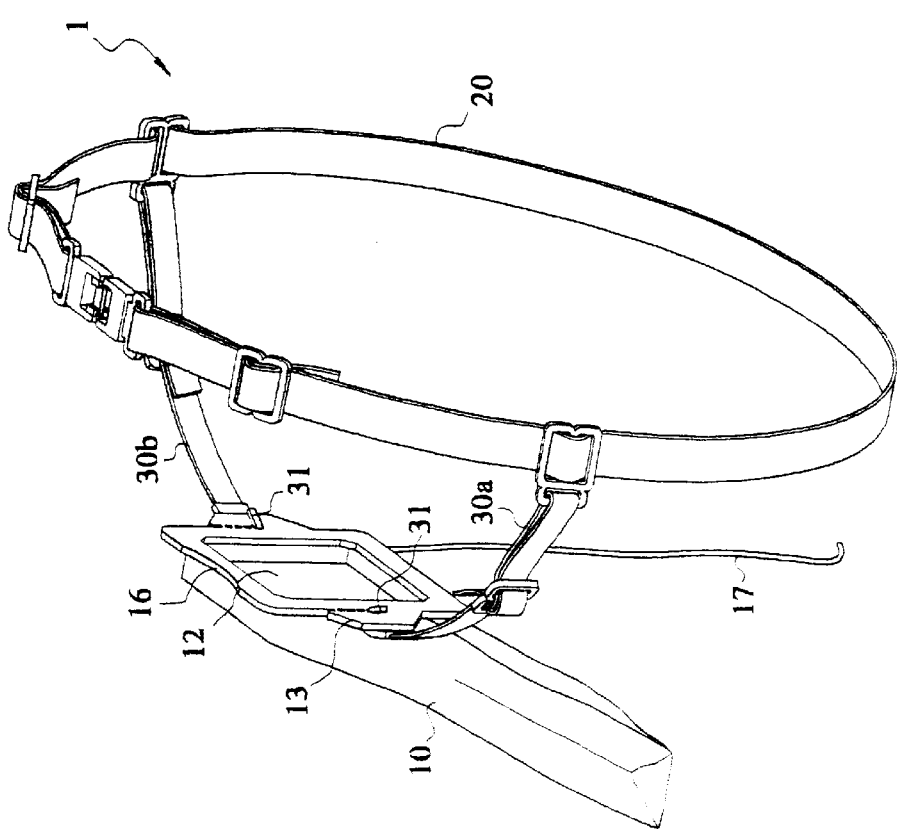
FIG. 3 is the schematic view of the status of the combination of FIG. 2.

First, referring to FIG. 2 and check against FIG. 3, the throwaway dog's dung bag and adjustable tie-belt combination unit 1 of the present invention includes a throwaway bag 10 and an adjustable tie-belt 20.

This bag 10 is a soft sack with hard frame 11 on its mouth and an opening 12 in its center. An arc concave rabbet 16 is provided on the top of the frame 11. Symmetrically protruding flanks 13 are formed on both sides. Plurality of lengthwise-arranged tearing rabbet 14 is provided on the upper, inner-side of the flanks 13. Hook rabbet 15 is situated under the tearing rabbet 14. A thin rope 17 is provided on one side of the frame 11.

The soft tie-belt 20 (vertical direction) has female-male engaging buckles 21 on both ends. This tie-belt 20 is connected together by buckles 21 to form a ring. Both ends of the tie-belt 20 also include two-directional buckle 22, whose length is adjustable, as well as three-directional buckles 23 on both sides. Two horizontal soft tie-belt 30a, 30b, one end of which is connected to three-directional buckles 23 of both sides of vertical tie-belt 20 through two-directional buckles 22 whose length is adjustable, and its free end individually has a hook 31.

As shown in FIG. 3, vertical tie-belt 20 can be adjusted to proper length for surrounding dog's abdomen. Two horizontal tie-belts 30a, 30b can also be adjusted to proper length for surrounding dog's buttocks. Hooks 31 on both free ends are hooked into the hook rabbets 15 on the frame 11 of bag 10. And the arc concave rabbet 16 on the upper end of the frame 11 departs from the root of dog's tail to let opening 12 against dog's anus for receiving excreta.

Figure 4:
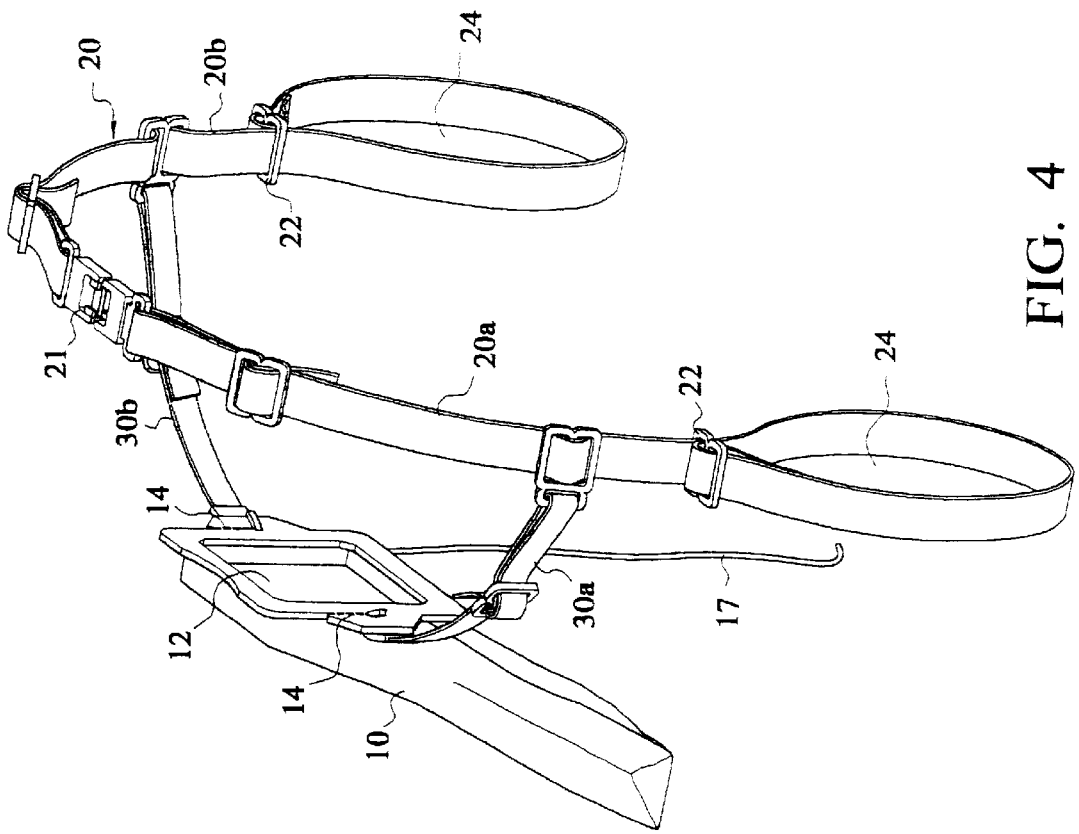
FIG. 4 is the schematic view of the status of the combination of another embodiment of the present invention.

FIG. 4 is another embodiment of this invention. It is different from FIG. 3 in that the vertical tie-belt 20 is made of two soft tie-belts 20a, 20b. One end of each tie-belt 20a, 20b has female-male engaging buckles 21 to mutually engage together. The other end of which is formed respectively a ring-shaped loop 24 by two-directional buckles 22 to fix and surround dog's legs. Other operations are similar to the aforesaid embodiments.

According to the present invention, tearing rabbets 14 are provided on the flanks 13 of frame 11 of bag 10. After using, it may tear apart from the tearing rabbets 14, or directly withdraw the hooks 31 for removing bag 10. After that, the used bag 10 may tie up its opening with the rope 17 for throwing away. This operation not only prevents stink from spreading or calling for flies but also avoids troubles of the owner of a dog to clear up its excreta at any time. Moreover, environment protection and sanitation conditions can be improved.

According to this invention, both vertical tie-belts 20, 20a, 20b and horizontal tie-belts 30a, 30b are made of elastic or non-elastic material. Its length is optionally adjustable in accordance with dog's figure so as not to influence the action of dog's legs. Besides, bag 10 and frame 11 may be made of regenerated paper or other regenerated material with combustibility. Therefore, its production cost is low, and will not increase the extra burden of garbage disposal.

The above description is only the preferred embodiment of the present invention. However, it is not confined to the embodiment scope of the present invention. Equivalents and modifications may be made to present invention without departing from the spirit and scope of the present invention.

The equivalent change and modifications made without parting from the claims of the present invention should still belong to the scope of coverage of the present invention.

To sum up all the forgoing, applying the throwaway dog's dung bag and adjustable tie-belt combination unit of the present invention is easier and more convenient to dispose of dog's excreta. It further enhances the environment protection and sanitation conditions, and is indeed an invention having novelty, inventive step and industrial applicability.

LIST OF NUMERALS AND SYMBOLS FOR MAJOR ELEMENTS

1 The throwaway dog's dung bag and adjustable tie-belt combination unit of the present invention
10 bag body
11 frame
12 opening
13 flanks
14 tearing rabbet
15 hook rabbet
16 concave rabbet
17 thin rope
20, 20a, 20b tie-belts (vertical direction)
21 buckles
22 two-directional buckles
23 three-directional buckles
24 loop
30a, 30b tie-belts (horizontal direction)
31 hooks

What is claimed is:

1. A throwaway dog's dung bag and adjustable tie-belt combination, comprising:

a throwaway bag in the form of a soft sack having an open mouth;

a hard frame fixed to the open mouth of said sack, said frame having a flank formed on each of two opposing sides;

hook rabbets formed on the flanks of said frame; and a tie-belt assembly for securing said throwaway bag to a dog's buttocks comprising a vertical and adjustable tie-belt for securement to the dog's abdomen, said vertical tie-belt having two ends provided with male-female engaging buckles, two three-directional buckles installed on opposing sides of the vertical tie-belt, a first horizontal and adjustable tie-belt having two ends wherein a first end is connected to a first of said three-directional buckles of said vertical tie-belt and a second end is provided with a hook for hooking to the hook rabbet formed on the first flank of said sack frame, and a second horizontal and adjustable tie-belt having two ends wherein a first end is connected to a second of said three-directional buckles of said vertical tie-belt and a second end is provided with a hook for hooking to the hook rabbet formed on the second flank of said sack frame.

2. A throwaway dog's dung bag and adjustable tie-belt combination according to claim 1, wherein said vertical and horizontal tie-belts are made of soft material.

3. A throwaway dog's dung bag and adjustable tie-belt combination according to claim 1, wherein said vertical tie-belt comprises two tie-belts, first ends of said two tie-belts are separately provided with female-male engaging buckles which are mutually connected together, and second ends of said two tie-belts separately form loops by means of two-directional buckles, said loops are separately used to surround the dog's legs.

4. A throwaway dog's dung bag and adjustable tie-belt combination according to claim 1, wherein an arc concave edge is provided on the top of the sack frame and tearing rabbits are separately provided on said frame flanks.

5. A throwaway dog's dung bag and adjustable tie-belt combination according to claim 1, which further comprises a thin rope provided on a flank of the sack frame.

6. A throwaway dog's dung bag and adjustable tie-belt combination according to claim 1, wherein said throwaway bag and said sack frame are made of paper or regenerated combustible material.

\* \* \* \* \*